United States Patent
Cogswell

(10) Patent No.: US 6,393,952 B2
(45) Date of Patent: May 28, 2002

(54) FOUR WHEEL DRIVE MANUAL HUB LOCK AND UNLOCK TOOL

(76) Inventor: Daniel William Cogswell, 231 Pumpkin Valley Rd., Eidson, TN (US) 37731

( * ) Notice: Subject to any disclaimer, the term of this patent is extended or adjusted under 35 U.S.C. 154(b) by 0 days.

(21) Appl. No.: 09/918,125

(22) Filed: Jul. 30, 2001

Related U.S. Application Data

(63) Continuation-in-part of application No. 09/538,584, filed on Mar. 29, 2000, now abandoned.

(51) Int. Cl.[7] ................................................ B25B 13/48
(52) U.S. Cl. ...................................... 81/176.15; 81/119
(58) Field of Search ............................... 81/119, 121.1, 81/124.2, 176.1, 176.15, 461

(56) References Cited

U.S. PATENT DOCUMENTS

| | | | |
|---|---|---|---|
| 4,061,058 A | * 12/1977 | Douglas | 81/176.15 |
| 4,252,036 A | * 2/1981 | Vanderhoof | 81/461 |
| 5,797,301 A | * 8/1998 | Huenke | 81/176.15 |

* cited by examiner

Primary Examiner—Joseph J. Hail, III
Assistant Examiner—David B. Thomas
(74) Attorney, Agent, or Firm—John D. Gugliotta

(57) ABSTRACT

The invention is an apparatus that aids in the manual locking and unlocking of four-wheel drive hub mechanisms. Two disc shaped plates are connected together with an elongated section of steel rod of a length of approximately six to eight inches. A channel of approximately ½ inch in width is cut in the front surface of one of the discs for receiving the hub locking lever on the four-wheel drive vehicle. A section of a spongy textured material formed in the shape of a handgrip is wrapped around and secured to the rod section to provide a gripping surface. The extended length of the rod section allows for additional leverage which makes the locking and unlocking of the hub easier.

6 Claims, 4 Drawing Sheets

FOUR WHEEL DRIVE MANUAL HUB LOCK AND UNLOCK TOOL

RELATED APPLICATIONS

The present invention is a Continuation in Part of U.S. Ser. No. 09/538,584, filed on Mar. 29, 2000 now abandoned.

BACKGROUND OF THE INVENTION

1. Field of the Invention

The present invention relates generally to four-wheel drive trucks and, more particularly, to a four-wheel drive hub locking and unlocking tool.

2. Description of the Related Art

The popularity of off-road and sport utility vehicles is at an all-time high. These vehicles, touted for their ruggedness, durability and ability to travel over a variety of terrains, possess features such as four-wheel drive, high-output engines and heavy-duty suspensions that will withstand the rigors of off-road travel. Especially popular for hunters and outdoors men, these vehicles allow them to reach camping and hunting sites that would otherwise be inaccessible. While most newer vehicles have electric mechanisms to engage and disengage the four-wheel drive systems, there is still a great abundance of vehicles with manual transfer hubs. These hubs must be locked and unlocked manually from outside the vehicle at each of the wheels. While this is not too much of an effort during fair weather conditions, it is a great aggravation during bad weather, which ironically, is when the four-wheel drive system is needed the most. Many times the user must remove gloves to rotate the transfer level subjecting the user to cold temperatures, and possible hand injury from skinned knuckles should the user lose balance while turning the hubs. Accordingly, there exists a need for a means by which manual four-wheel drive hubs can be engaged and disengaged quickly and easily. The development of the four wheel drive manual hub lock and unlock tool fulfills this need.

In the related art, there exists various patents for unlocking tools for hubs for four wheel drive vehicles. However, there does not exist any patents for a hub locking/unlocking hubs for four wheel drive vehicles with an elongated handle and a handgrip like the present invention.

A search of the prior art did not disclose any patents that read directly on the claims of the instant invention; however, the following references were considered related:

| U.S. Pat. No. | Inventor | Issue Date |
| --- | --- | --- |
| 5,908,080 | Bigley et al. | Jun. 1, 1999 |
| 5,520,272 | Ewer et al. | May 28, 1996 |
| 4,061,058 | Douglas | Dec. 6, 1977 |
| D 357,617 | Morrissette | Apr. 25, 1995 |
| D 261,606 | La Fargo et al. | Nov. 3, 1981 |
| 5,850,679 | Hoffman | Dec. 22, 1998 |
| 5,797,301 | Huenke | Aug. 25, 1998 |
| 4,620,462 | Parker | Nov. 4, 1986 |
| 4,028,915 | Stahl | June 4, 1977 |
| D 341,759 | Vasilakis | Nov. 30, 1993 |
| D 292,963 | Murtaugh | Dec. 1, 1987 |

Consequently, a need has been felt for providing an apparatus with an improved handle and a handgrip to improve torque.

SUMMARY OF THE INVENTION

It is therefore an object of the present invention to provide an improved four-wheel drive hub tool which allows manual four-wheel drive hubs to be engaged and disengaged easily.

It is another object of the present invention to provide increased leverage on the four-wheel drive hub tool.

It is another object of the present invention to decrease the time that must be spent in inclement weather engaging and disengaging hubs.

It is yet another object of the present invention to protects the user's hands.

It is yet still another object of the present invention that it can be used with gloves on.

It is another object of the present invention to work with all four-wheel drive vehicles.

Briefly described according to one embodiment of the present invention, the four wheel drive manual hub lock and unlock tool, as its name implies, is an apparatus that aids in the manual locking and unlocking of four-wheel drive hub mechanisms. Two disc shaped plates are connected together with an elongated section of steel rod of a length of approximately six to eight inches. A channel of approximately ½ inch in width is cut in the front surface of one of the discs for receiving the hub locking lever on the four-wheel drive vehicle. A section of a spongy textured material formed in the shape of a handgrip is wrapped around and secured to the rod section to provide a gripping surface. The extended length of the rod section allows for additional leverage which makes the locking and unlocking of the hub easier. Additionally, with the users hands located away from the hub, there is less chance for hand injury, should the user slip when the hub turns. Also, the user may keep their gloves in inclement weather offering additional protection for hands. The use of the four wheel drive manual hub lock and unlock tool makes the task of locking and unlocking hubs quick, easy and effortless no matter what the weather conditions are, while increasing safety for the user.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
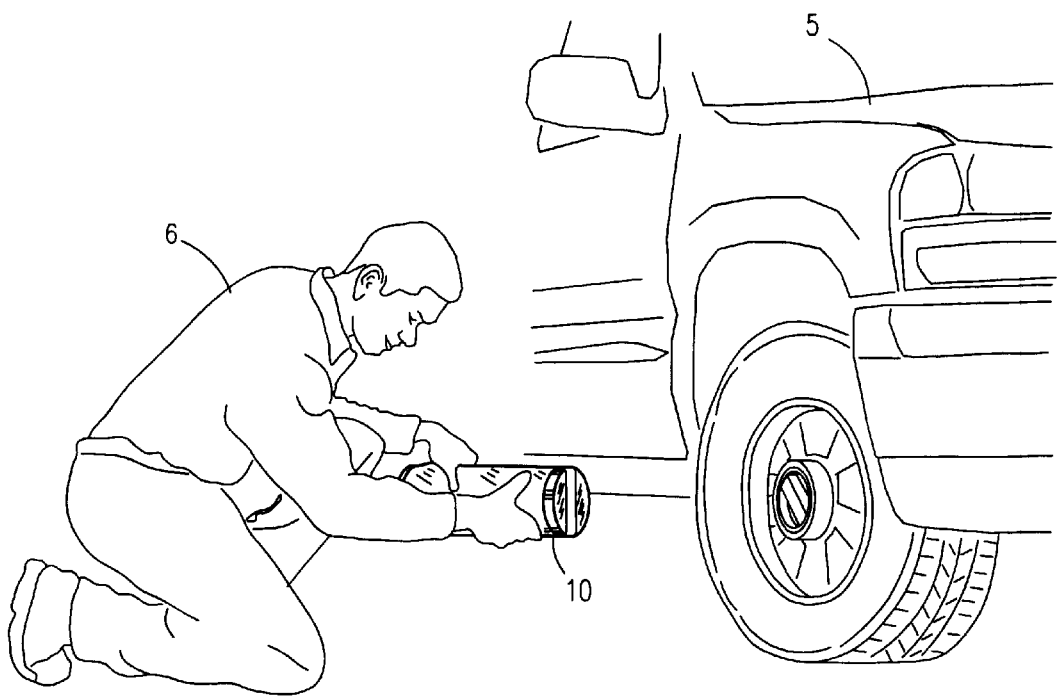
FIG. 1 is a perspective view showing the intended use of the four wheel drive manual hub lock and unlock tool, according to the preferred embodiment of the present invention.

Referring now to FIG. 1, a four wheel drive manual hub lock and unlock tool 10 is shown, according to the present invention, for use in locking and unlocking the four wheel drive hub on four-wheel drive vehicles 5 and the like. Typically, such vehicles are manually switched from two wheel drive to four wheel drive by twisting the inner lever on both the left and right front wheel hub. Normally, this is done by grasping the lever by hand and turning it. The hub has only two positions. One is for two wheel drive and the other is for four wheel drive. However, with the four wheel drive manual hub lock and unlock tool 10 this process is greatly simplified. A user 6 simply grabs the elongated handle and engages the channel with the lever in the center of the hub and urges the lever into the desired position.

Figure 2:
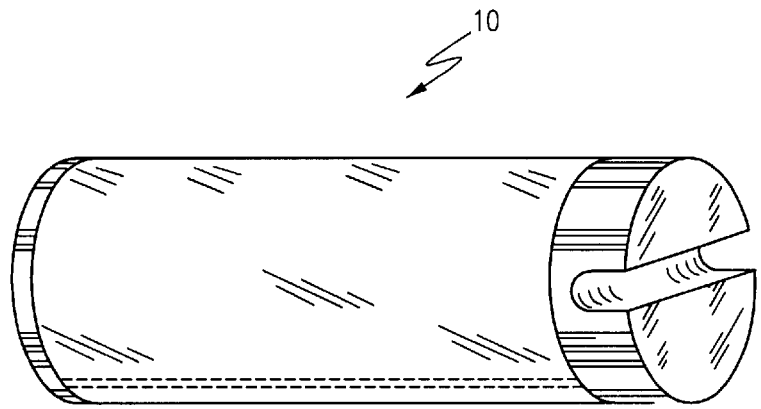
FIG. 2 is a perspective view of a four wheel drive manual hub lock and unlock tool, according to the preferred embodiment of the present invention.
Figure 3:
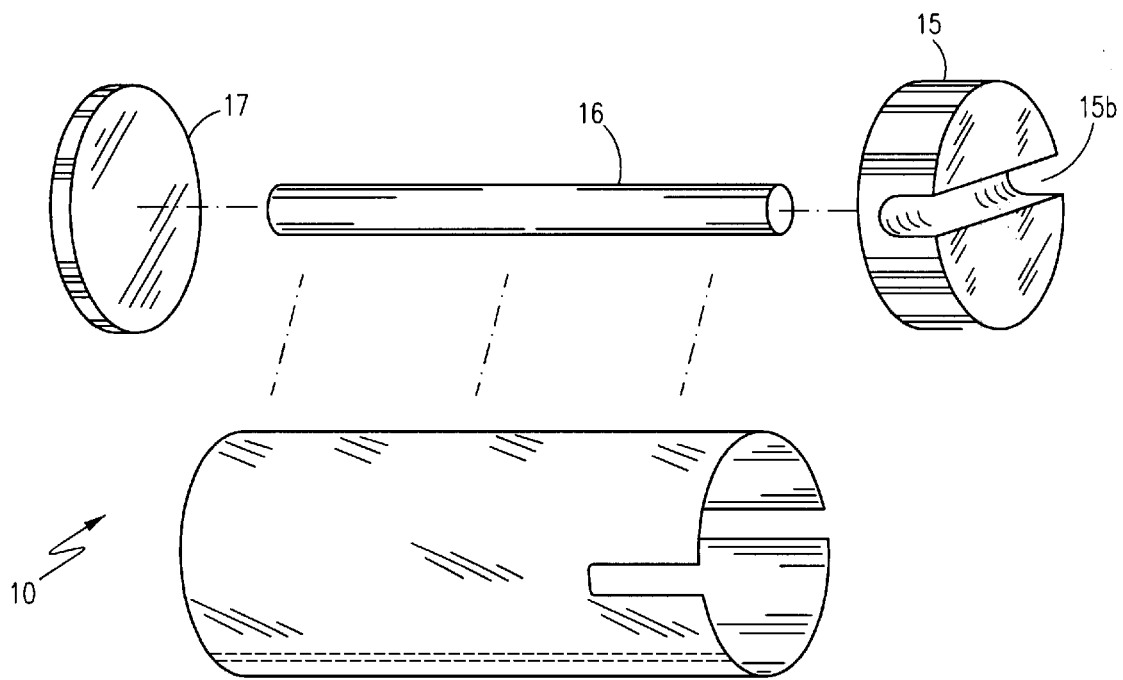
FIG. 3 is an exploded perspective view of a four wheel drive manual hub lock and unlock tool, according to the preferred embodiment of the present invention.

Referring now to FIGS. 2 and 3, a perspective and exploded perspective view of the four wheel drive manual hub lock and unlock tool 10 is shown. Essentially, the device 10 consists of two discs, front disc 15 and rear disc 17 connected together by an elongated rod 16 to the center of each disc in a perpendicular fashion as shown. Elongated rod 16 acts as a handle between front disc 15 and rear disc 17. Front disc 15 and rear disc 17 are fabricated from metal and attached to elongated rod 16 by welding or the entire assembly can be formed by metalworking machinery. A channel 15b is formed in the outer surface of front disc 15 for engaging the locking/unlocking lever of a four wheel drive vehicle hub. The size of front disc 15, rear disc 17, and channel 15b are chosen according to the particular make and model of four wheel drive vehicle it is intended for. Many different sizes would have to made available for the various size hubs according to vehicle and wheel hub manufacturer.

Figure 4:
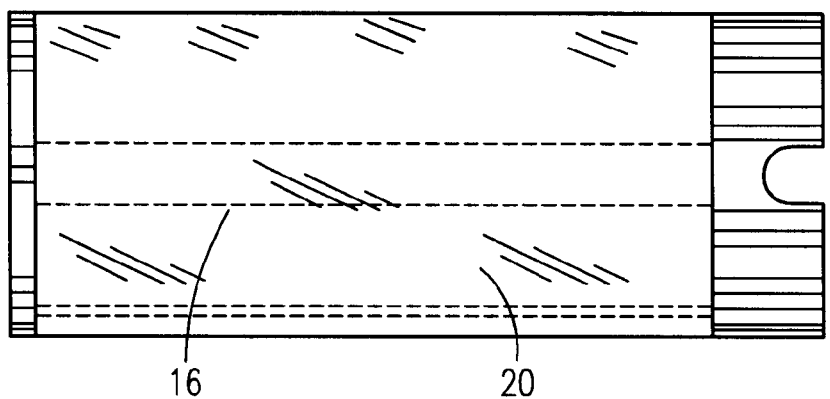
FIG. 4 is a side view of a four wheel drive manual hub lock and unlock tool, according to the preferred embodiment of the present invention.

Referring to FIG. 4, the finished assembly is wrapped by a handgrip 20 made from a slip resistant material such as rubber and formed with grips that conform to a user's hand.

Figure 5:
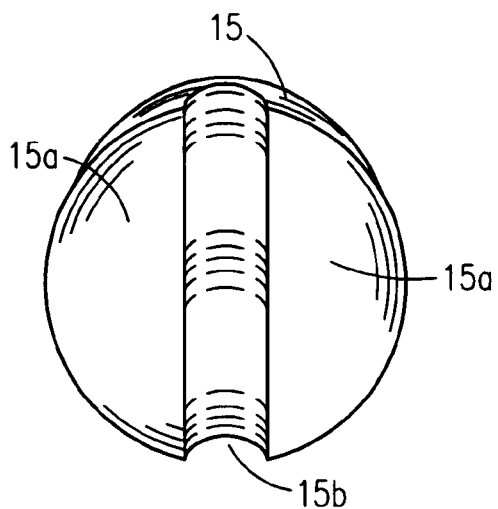
FIG. 5 is an end view of a Four wheel drive manual hub lock and unlock tool showing the channel formed in the disc shaped plate for engaging the locking/unlocking lever on a four-wheel drive hub; according to the preferred embodiment of the present invention.

FIG. 5 shows the outer surface of front disc 15 with a channel 15b formed through the center. Channel 15b is wide enough to engage the locking/unlocking lever of a four wheel drive hub. A pair of ridges 15a sit adjacent to channel 15b.

Figure 6:
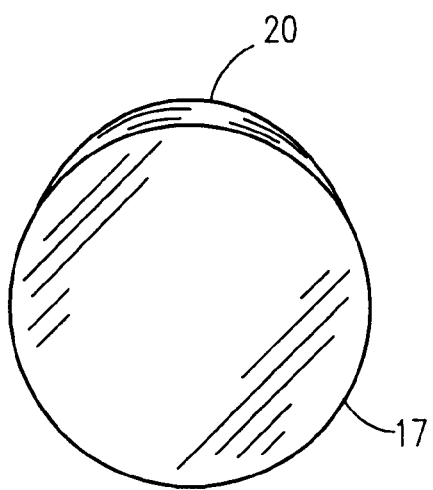
FIG. 6 is the opposite end view thereof of a four wheel drive manual hub lock and unlock tool; according to the preferred embodiment of the present invention.

A rear view of the four wheel drive manual hub lock and unlock tool 10 is shown in FIG. 6 showing the slightly oversize handgrip 20 on the assembled device 10.

Figure 7:
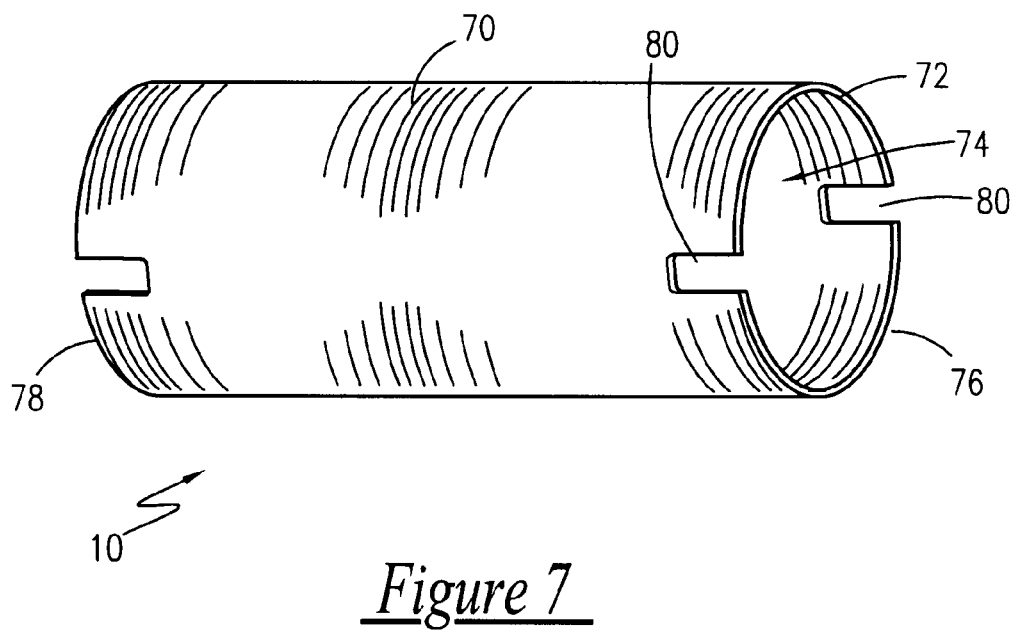
FIG. 7 is a perspective view of an alternate embodiment for a four wheel drive manual hub lock and unlock tool.

Referring now to FIG. 7, a perspective view of the four wheel drive manual hub lock and unlock tool 10 is shown according to an alternate embodiment. Essentially, the device 10 consists of an elongated, cylindrical shaft body 70 having an circumferencial outer body wall 72 circumscribing an inner shaft cavity 74. A first engagement end 76 is opposite a second engagement end 78. In its preferred embodiment, the overall length of the shaft body 70 is envisioned as being approximately 8 inches, and the outer body wall 72 is envisioned as forming an overall outside diameter of 1⅝ inches. The first engagement end 76 forms a pair of rececess indentation slots 80, parallelly aligned about the shaft wall such as to allow for engagement with the wheel locking hub of the particular make and model of four wheel drive vehicle it is intended for. Many different sizes would have to made available for the various size hubs according to vehicle and wheel hub manufacturer.

2. Operation of the Preferred Embodiment

In operation, the end of present invention with the specially formed channel is simply placed over the locking/unlocking lever on either the left or right locking/unlocking lever on a four wheel drive hub. The lever is urged into either the locking or unlocking position by grabbing the handle and twisting. The tool is then removed and stored in the vehicle until the next use.

The foregoing description is included to illustrate the operation of the preferred embodiment and is not meant to limit the scope of the invention. The scope of the invention is to be limited only by the following claims.

What is claimed is:

1. A tool for manual locking and unlocking the four-wheel drive hub on four-wheel drive vehicles, said tool comprised of:

an elongated rod, said elongated rod being linearly elongated and having a first end opposite a second end;

a front disc, said front disc attached to said first end of said elongated rod in a perpendicular fashion and having a channel formed in an outer surface of said front disc for engaging the locking and unlocking lever of a four wheel drive vehicle hub; and a rear disc, said rear disc attached to said second end of said elongated rod in a perpendicular fashion.

2. The tool for manual locking and unlocking the four-wheel drive hub on four-wheel drive vehicles of claim 1, wherein said front disc, said rear disc and said elongated rod are fabricated from metal and said front disc and said rear disc are attached at a center of said front disc and said rear disc to said elongated rod by welding.

3. The tool for manual locking and unlocking the four-wheel drive hub on four-wheel drive vehicles of claim 2, wherein the size of said front disc, said rear disc and said channel are chosen according to the particular make and model of four-wheel of four-wheel drive vehicle said tool is intended for.

4. The tool for manual locking and unlocking the four-wheel drive hub on four-wheel drive vehicles of claim 3, wherein said channel is wide enough to engage the locking and unlocking lever of a four wheel drive hub and a pair of ridges sit adjacent to said channel.

5. The tool for manual locking and unlocking the four-wheel drive hub on four-wheel drive vehicles of claim 1, further comprising:

a handgrip, said handgrip is wrapped around said tool and is made of a slip resistant material which facilitates conformation with user's hand.

6. The tool for manual locking and unlocking the four-wheel drive hub on four-wheel drive vehicles of claim 5, wherein said slip resistant material is rubber.

* * * * *